US007822009B2

United States Patent
Cheng et al.

(10) Patent No.: US 7,822,009 B2
(45) Date of Patent: Oct. 26, 2010

(54) DISTRIBUTED MEDIUM ACCESS PROTOCOL FOR WIRELESS MESH NETWORKS

(75) Inventors: Ray-Guang Cheng, Keelung (TW); Cun-Yi Wang, Chungho (TW); Jen-Shun Yang, Chungli (TW)

(73) Assignee: Industrial Technology Research Institute, Hsinchu (TW)

( * ) Notice: Subject to any disclaimer, the term of this patent is extended or adjusted under 35 U.S.C. 154(b) by 778 days.

(21) Appl. No.: 11/381,809

(22) Filed: May 5, 2006

(65) Prior Publication Data

US 2006/0268797 A1    Nov. 30, 2006

Related U.S. Application Data

(60) Provisional application No. 60/679,199, filed on May 9, 2005.

(51) Int. Cl.
  H04B 7/212    (2006.01)
  H04W 4/00    (2009.01)
  H04L 12/43    (2006.01)

(52) U.S. Cl. .................. 370/348; 370/328; 370/329; 370/443; 370/459

(58) Field of Classification Search .............. 370/329, 370/229, 400, 389
See application file for complete search history.

(56) References Cited

U.S. PATENT DOCUMENTS

| 6,363,062 | B1 * | 3/2002 | Aaronson et al. | 370/348 |
|---|---|---|---|---|
| 7,286,516 | B2 * | 10/2007 | Delaney et al. | 370/338 |
| 7,319,684 | B2 * | 1/2008 | Tamaki et al. | 370/337 |
| 7,623,481 | B2 * | 11/2009 | Chen | 370/322 |
| 2002/0019880 | A1 * | 2/2002 | Sakakura | 709/245 |

(Continued)

FOREIGN PATENT DOCUMENTS

WO    WO 00/76088    * 12/2000

(Continued)

OTHER PUBLICATIONS

Cheng, et al., IEEE Communications Letters, "Ripple: Wireless Token-Passing Protocol for Multi-hop Wireless Mesh Networks", vol. 10, No. 2, pp. 123-125 (2006).

(Continued)

*Primary Examiner*—Jayanti K Patel
*Assistant Examiner*—Christopher T Wyllie
(74) *Attorney, Agent, or Firm*—Alston & Bird LLP

(57) ABSTRACT

A system for data communication in a wireless mesh network that comprises a wired gateway, and a plurality of nodes stationary with respect to each other being disposed in a pattern including at least one path, each of the plurality of nodes located in the at least one path having a transmission range overlapped with that of an immediate adjacent node located in the at least one path, further comprising a node connected to the wired gateway, and an end node located at one end of the at least one path remote from the gateway-connected node, wherein each of a subset of the plurality of nodes, wherein said subset excludes the gateway connected node and the end node, operates in one of a first state in which a first node of the subset is ready to transmit a data frame, a second state at which a second node in the subset is prohibited from transmitting or receiving a data frame and a third state at which a third node in the subset is ready to receive a data frame.

20 Claims, 11 Drawing Sheets

U.S. PATENT DOCUMENTS

| | | | |
|---|---|---|---|
| 2002/0172186 A1* | 11/2002 | Larsson | 370/349 |
| 2003/0236103 A1* | 12/2003 | Tamaki et al. | 455/552.1 |
| 2004/0236882 A1* | 11/2004 | Simpson et al. | 710/52 |
| 2005/0099980 A1* | 5/2005 | Delaney et al. | 370/338 |
| 2005/0135242 A1* | 6/2005 | Larsen et al. | 370/229 |
| 2005/0238058 A1* | 10/2005 | Peirce et al. | 370/503 |
| 2006/0153107 A1* | 7/2006 | Ji | 370/282 |
| 2007/0025288 A1* | 2/2007 | Nagai et al. | 370/329 |
| 2007/0191063 A1* | 8/2007 | Iacono et al. | 455/561 |
| 2009/0055909 A1* | 2/2009 | Cheng et al. | 726/6 |

OTHER PUBLICATIONS

Janguen, et al., IEEE Wireless communications, "The Nominal Capacity of Wireless Mesh Networks", vol. 10, pp. 8-14 (2003).

Xu, et al., IEEE Communications Magazine, "Does the IEEE 802.11 MAC Protocol Work Well in Multihop Wirelss ad hoc Networks?", vol. 39, pp. 130-137 (2002).

Li, et al., Proceedings of AM MOBICOM, "Capacity of ad hoc Wirelss Networks", pp. 61-69 (2002).

Xu, et al., IEE Globecom, "How effective is the IEEE 802.11 RTS/CTS handshake in ad hoc networks?", vol. 1, pp. 72-76 (2002).

Deng, et al., IEEE ICUPC, "Dual Busy Tone Multiple Access (DBTMA): A New Medium Access Control for Packet Radio Networks", vol. 2, pp. 973-977 (1998).

Jain, et al., IEEE ICCCN, "A multichannel CSMA MAC protocol with receiver-based channel selection for multihop wireless networks", pp. 432-439 (2001).

Jagadeesan, et al., IEEE ICC, "Interleaved Carrier Sense Multiple Access: An Efficient MAC Protocol for ad hock Wireless Networks", vol. 2, pp. 11-15 (2003).

Acharya, et al., IEEE Wireless Communications, "High-Performance Architecture for IP-Based Multihop 802.11 Networks", vol. 10, pp. 22-28 (2003).

Raguin, et al., IEEE WCNC, "Queue-Driven Cut-Through Medium Access in Wireless ad hoc Networks", vol. 3, pp. 1909-1914 (2004).

Hiertz, et al., IEEE 802.11, "Multihop Connections Using 802.11", ComNets, Aachen University, Germany, pp. 1-17 (2004).

* cited by examiner

DISTRIBUTED MEDIUM ACCESS PROTOCOL FOR WIRELESS MESH NETWORKS

CROSS-REFERENCE TO RELATED APPLICATIONS

This application claims the benefit of U.S. Provisional Application No. 60/679,199, filed May 9, 2005, which is herein incorporated by reference in its entirety.

BACKGROUND OF THE INVENTION

The present invention generally relates to wireless communication and, more particularly, to a distributed medium access protocol for wireless mesh networks.

Recently, multi-hop wireless networks and proprietary commercial systems have focused on a class of networks termed "mesh networks". Unlike mobile ad hoc networks ("MANETs"), in which communication generally occurs between any pair of nodes through several mobile relaying nodes, wireless mesh networks ("WMNs") serve as access networks utilizing non-mobile relaying nodes to provide wireless backbone services for nomadic users to access the wired Internet. In such an environment, it is essential for all nodes to support quality-of-service (QoS) transport in multi-hop operation under a highly loaded situation. However, it has been found difficult to fulfill the above-mentioned requirements using the standard 802.11 distributed coordination function ("DCF"). It has also been found that ready-to-send/clear-to-send (RTS/CTS) does not efficiently schedule transmissions, and therefore fails to obtain a good schedule in a multi-hop chain. Although techniques such as multi-channel, spatial-reuse, cut-through, or enhanced physical carrier sensing may improve the performance of 802.11 DCF, these techniques still rely on the random-access-based carrier sense multiple access with collision avoidance ("CSMA/CA") mechanism and thus, suffer from the same fairness problems, backoff inefficiencies, and unavoidable high collision rate problems under a highly loaded environment. These problems are schematically illustrated and discussed below.

FIG. 1 is a schematic diagram illustrating hidden and exposed nodes in a network. A hidden-node problem refers to collisions of packets at a receiver node due to simultaneous transmission at different nodes, which are not within the direct transmission range of a sender but are within the transmission range of the receiver. Referring to FIG. 1, a first sender node $S_1$ having a transmission range $TR_1$ and a second sender node $S_2$ having a transmission range $TR_2$ are hidden from one another when both attempt to send packets to a first receiver node $R_1$ located within the transmission ranges $TR_1$ and $TR_2$. A collision occurs when both sender nodes $S_1$ and $S_2$ transmit at the same time without knowing about the transmission of one another. It is difficult for a sender node to detect the existence of hidden nodes because the sender node is not able to sense transmission from the hidden nodes.

An exposed-node problem refers to the inability of a sender node, which is blocked due to a nearby sender node, to transmit packets to a receiver node. Referring again to FIG. 1, a third sender node $S_3$, exposed to the transmission range $TR_1$ of first node $S_1$, is prohibited from transmitting packets to a second receiver node $R_2$ when first node $S_1$ is transmitting packets to first receiver node $R_1$. However, third sender node $S_3$ should be able to transmit packets to second receiver node $R_2$ without incurring any collision when first sender node $S_1$ is transmitting packets to first receiver node $R_1$. It is also difficult for a sender node to detect exposed nodes because the sender node is not able to sense transmission from the exposed nodes.

FIGS. 2A and 2B are schematic diagrams illustrating hidden and exposed nodes in a mesh network. FIG. 2A illustrates a hidden-node problem in the mesh network. Referring to FIG. 2A, the mesh network includes nodes A, B, C and D, which transmit and receive signals in a same radio channel. When data packets are to be sent from node A to node B, node A broadcasts a ready-to-send (RTS) frame in its transmission range. Node B, located within the transmission range of node A, receives the RTS frame and transmits a clear-to-send (CTS) frame to node A, which does not send the data packets until the CTS frame sent from node B is received. When node B broadcasts the CTS frame, node D broadcasts another RTS frame denoted as $RTS_1$ to node C. Node C, located within the transmission ranges of node B and node D, simultaneously receives the CTS and $RTS_1$ frames, resulting in a collision. Node D, having not received any CTS frame from node C over a period of time, broadcasts still another RTS frame denoted as $RTS_2$. However, when node C transmits a CTS frame in the radio channel in response to the $RTS_2$ frame, a collision occurs at node B, which receives data packets from node A while overhearing the CTS frame sent from node C.

FIG. 2B illustrates an exposed-node problem in the mesh network. Referring to FIG. 2B, node B transmits a CTS frame in response to an RTS frame sent from node A. Node C, overhearing the CTS frame, is prohibited from transmitting an RTS frame. Node C must wait for a period of time, i.e., backoff, before it can transmit an RTS frame. The backoff is undesired and may often adversely affect the overall system performance of the mesh network.

FIG. 3A is a schematic diagram illustrating multihop packet forwarding in a network system using 802.11 DCF, which has been disclosed in a paper entitled "Multihop Connections Using 802.11" Hiertz et al. Referring to FIG. 3A, unidirectional multihop packets are forwarded along a long chain of nodes. In this chain model, all packets are originated at a first node and are hop-by-hop forwarded to a last node in the chain. The multihop packet forwarding uses 802.11 DCF, which is based on the CSMA/CA mechanism adopted by IEEE 802.11 medium access control ("MAC"). In the example, a packet 2 forwarded by a node n+1 is affected by a packet 1 being forwarded by a node n+3. It has been found that the maximum utilization of a chain using 802.11 with RTS/CTS can only approach ⅐. However, a desirable utilization of a long chain of nodes in isolation should be ¼ or even ⅓, depending on the spatial reuse distance of the raw channel bandwidth of the radio if an ideal MAC protocol is adopted.

FIG. 3B is a schematic diagram illustrating multihop packet forwarding in a network system using an ideal MAC protocol. Referring to FIG. 3B, with the ideal MAC protocol, two nodes separated by a spatial reuse distance are able to send at the same time without affecting each other. Under this ideal condition, data packets are forwarded hop-by-hop like ripples of water moving apart from a central location. To activate this "ripple phenomenon," each node needs to know the optimum duration between every two consecutive packet transmissions. For example, a node n+1, instead of a node n itself, can determine the optimal duration for the node n by overhearing an RTS frame transmitted by a node n+2. Consequently, the node n+1 may notify the node n to send a next packet at the end of the node n+2's transmission.

A complete solution to the hidden and exposed problems requires centralized and global knowledge among all mesh nodes. Such a solution would require extensive monitoring and management overhead. It is therefore desirable to have a distributed solution that approximates the complete solution based on limited information exchange among nodes in order to improve the throughput and quality of service (QoS) of a WMN and enhance the equity in accessing the wireless medium of a WMN.

BRIEF SUMMARY OF THE INVENTION

The present invention is directed to a system and a method that obviate one or more problems resulting from the limitations and disadvantages of the prior art.

In accordance with an embodiment of the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediately adjacent node, performing a first handshake between a first node and a second node in the at least one path, the second node being disposed immediately downstream from the first node, entering the first node into a first state in which the first node is ready to transmit a data frame, entering the second node into a second state in which the second node is ready to receive a data frame, transmitting a first data frame from the first node to the second node, performing a second handshake between the second node and a third node disposed immediately downstream from the second node, switching the first node to a third state in which the first node is prohibited from transmitting or receiving a data frame, switching the second node to the first state, entering the third node into the second state, and transmitting a second data frame from the second node to the third node.

Also in accordance with the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediately adjacent node, performing a first handshake between a (3N−2)-th node and a (3N−1)-th node, the (3N−1)-th node being disposed immediately downstream from the (3N−2)-th node in the at least one path, N being an integer greater than zero, entering the (3N−2)-th node into a first state at which the (3N−2) node is ready to transmit a data frame, entering the (3N−1)-th node into a second state at which the (3N−1) node is ready to receive a data frame, transmitting a first data frame from the (3N−2)-th node to the (3N−1)-th node, performing a second handshake between the (3N−1)-th node and the 3N-th node, the 3N-th node being disposed immediately downstream the (3N−1)-th node in the at least one path, switching the each (3N−2)-th node to a third state at which the (3N−2) node is prohibited from transmitting or receiving a data frame, switching the each (3N−1)-th node to the first state, entering the each 3N-th node into the second state, and transmitting a second data frame from the (3N−1)-th node to the 3N-th node.

Further in accordance with the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediate adjacent node located in the at least one path, passing a token from a first node to a second node disposed immediately downstream from the first node in the at least one path by transmitting a first data frame from the first node to the second node, entering the first node into a first state at which the first node is prohibited from transmitting or receiving a data frame, entering the second node into a second state at which the second node is ready to transmit a data frame, passing the token from the second node to a third node disposed immediately downstream the second node in the at least one path by transmitting a second data frame from the second node to the third node, switching the first node to a third state at which the first node is ready to receive a data frame, switching the second node to the first state, and entering the third node into the second state.

Still in accordance with the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediately adjacent node located in the at least one path, performing a first handshake between a first node and a second node, the second node being disposed immediately upstream from the first node in the at least one path, entering the first node into a first state at which the first node is ready to transmit a data frame, entering the second node into a second state in which the second node is ready to receive a data frame, transmitting an acknowledge frame from the second node, performing a second handshake between a third node and a fourth node respectively in response to the acknowledge frame, the fourth node being disposed immediately upstream from the second node and the third node in the at least one path, switching the first node to the second state, switching the second node to a third state at which a node is prohibited from transmitting or receiving a data frame, entering the third node into the first state, and entering the fourth node into the second state.

Yet still in accordance with the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediate adjacent node located in the at least one path, performing a first handshake between a (3N−2)-th node and a (3N−1)-th node in the at least one path, the (3N−1)-th node being disposed immediately upstream the (3N−2)-th node, N being an integer greater than zero, entering the (3N−2)-th node into a first state at which the (3N−2) node is ready to transmit a data frame, entering the (3N−1)-th node into a second state at which the (3N−1) node is ready to receive a data frame, transmitting an acknowledge frame from the (3N−1)-th node, performing a second handshake between the 3N-th node and the (3N+1)-th node in response to the acknowledge frame, the 3N-th node and the (3N+1)-th node being respectively disposed immediately upstream the (3N−1)-th node and the 3N-th node, switching the (3N−2)-th node to the second state, switching the (3N−1)-th node to a third state at which a node is prohibited from transmitting or receiving a data frame, entering the 3N-th node into the first state, and entering the (3N+1) node into the second state.

Also in accordance with the present invention, there is provided a method for data communication in a wireless mesh network that comprises providing a plurality of nodes being stationary with respect to each other, disposing the plurality of nodes in a pattern including at least one path, each of the plurality of nodes located in the at least one path having a transmission range overlapped with that of an immediate adjacent node, transmitting a first acknowledge frame from a first node, passing a token to a second node disposed immediately upstream the first node in the at least one path in response to the first acknowledge frame, entering the first node into a first state in which the first node is prohibited from transmitting or receiving a data frame, entering the second node into a second state in which the second node is ready to transmit a data frame, transmitting a second acknowledge frame from a third node disposed immediately upstream the second node in the at least one path, passing the token from the second node to a fourth node disposed immediately upstream the third node in the at least one path in response to the second acknowledge frame, switching the first node to the second state, switching the second node to a third state at which a node is ready to receive a data frame, entering the third node into the first state, and entering the fourth node into the second state.

Still in accordance with the present invention, there is provided a system for data communication in a wireless mesh network that comprises a wired gateway, and a plurality of nodes stationary with respect to each other being disposed in a pattern including at least one path, each of the plurality of nodes located in the at least one path having a transmission range overlapped with that of an immediate adjacent node located in the at least one path, further comprising a node connected to the wired gateway, and an end node located at one end of the at least one path remote from the gateway-connected node, wherein each of a subset of the plurality of nodes, wherein said subset excludes the gateway connected node and the end node, operates in one of a first state in which a first node of the subset is ready to transmit a data frame, a second state at which a second node in the subset is prohibited from transmitting or receiving a data frame and a third state at which a third node in the subset is ready to receive a data frame.

Yet still in accordance with the present invention, there is provided a system for data communication in a wireless mesh network that comprises a wired gateway, and a plurality of nodes stationary with respect to each other being disposed in a pattern including at least one path, each of the plurality of nodes located in the at least one path having a transmission range overlapped with that of an immediate adjacent node located in the at least one path, further comprising a first node operating in turn among a first state at which the first node is ready to transmit a data frame, a second state at which the first node is prohibited from transmitting or receiving a data frame and a third state at which the first node is ready to receive a data frame, a second node disposed immediately downstream from the first node in one of the at least one path operating in turn among the second state, the third state and the first state, and a third node disposed immediately downstream from the second node in the at least one path operating in turn among the third state, the first state and the second state.

Further in accordance with the present invention, there is provided a system for data communication in a wireless mesh network that comprises a wired gateway, and a plurality of nodes stationary with respect to each other being disposed in a pattern including at least one path, each of the plurality of nodes located in the at least one path having a transmission range overlapped with that of an immediate adjacent node located in the at least one path, further comprising a first node operating in turn among a first state at which the first node is ready to receive a data frame, a second state at which the first node is prohibited from transmitting or receiving a data frame and a third state at which the first node is ready to transmit a data frame, a second node disposed immediately upstream the first node in the at least one path operating in turn among the second state, the third state and the first state, and a third node disposed immediately upstream the second node in the at least one path operating in turn among the third state, the first state and the second state.

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION OF THE INVENTION

A distributed medium access protocol, Ripple, which may simultaneously achieve fairness, high utilization, and optimal spatial reuse for WMNs is disclosed. Different to existing random-access-based protocols, the Ripple protocol adopts a controlled access mechanism, where a node cannot send unless it has been authorized by other nodes. With controlled access, the proposed Ripple protocol prevents nodes from unintentional packet collisions and backoff and thus, enhances the network utilization. The Ripple protocol ensures that each node fairly utilizes the shared wireless spectrum, and ensures that QoS traffic management mechanisms are able to be built on the Ripple protocol.

Figure 1:
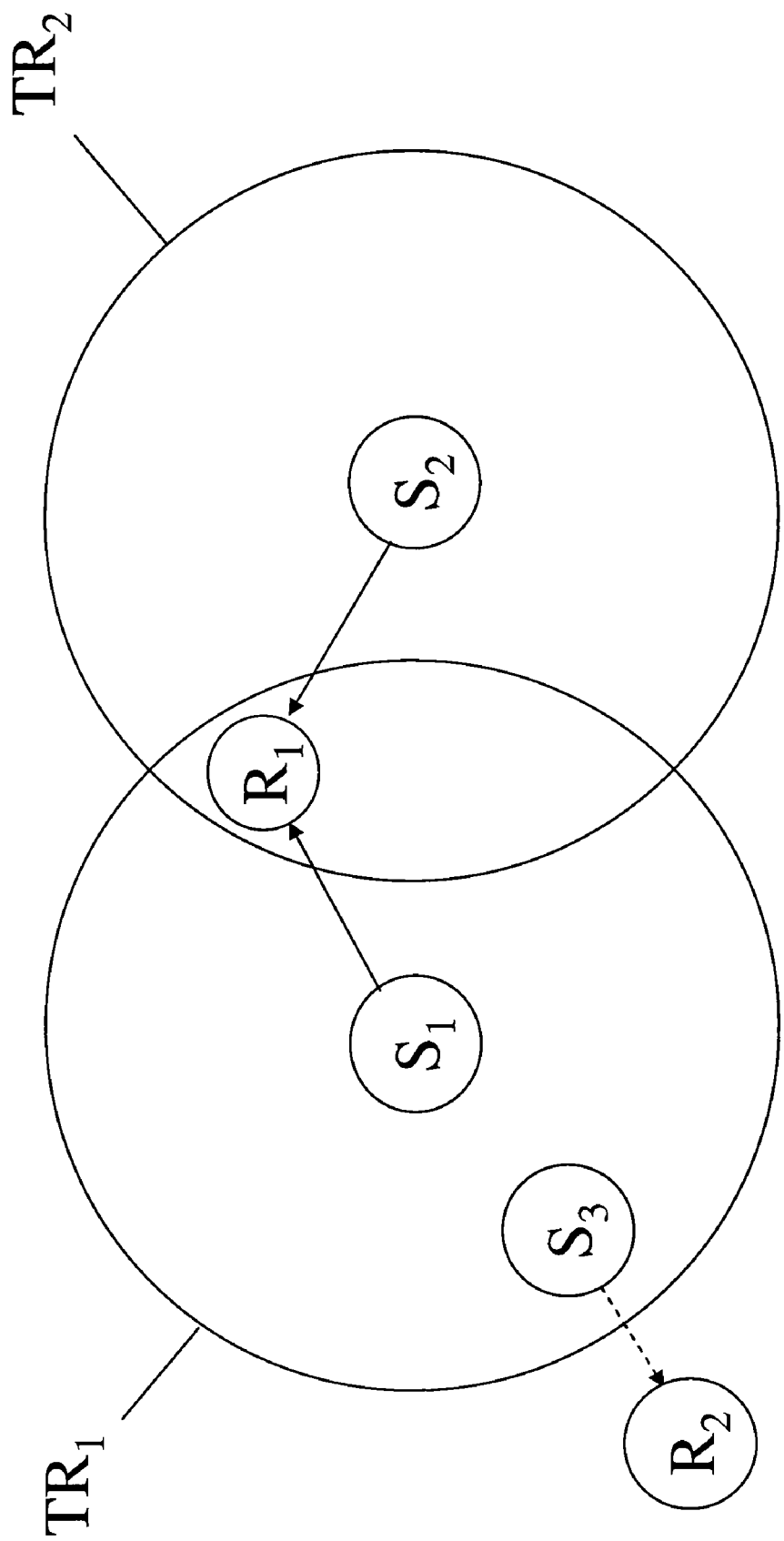
FIG. 1 is a schematic diagram illustrating hidden and exposed nodes in a network.
Figure 2A:
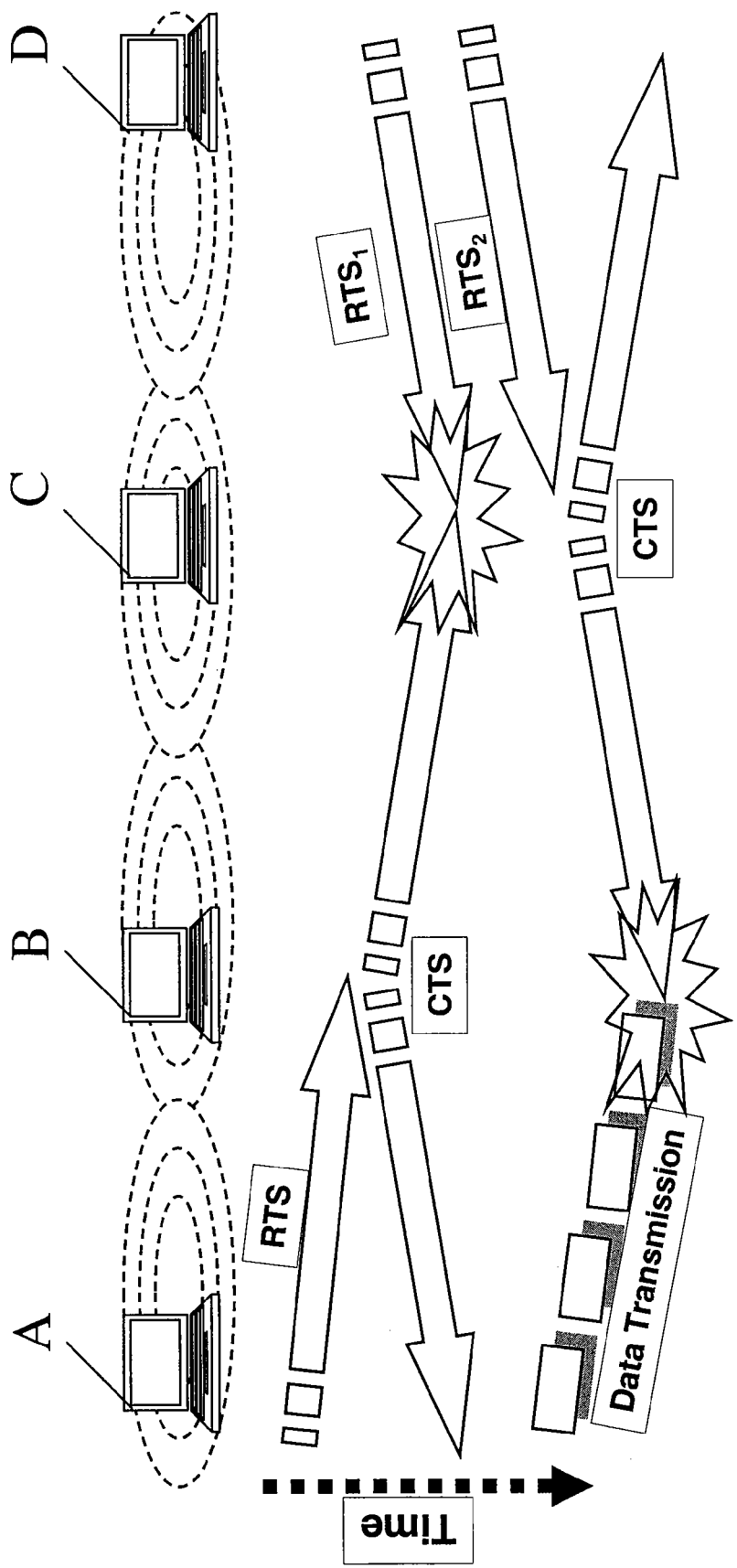
FIGS. 2A and 2B are schematic diagrams illustrating hidden and exposed nodes in a mesh network.
Figure 2B:
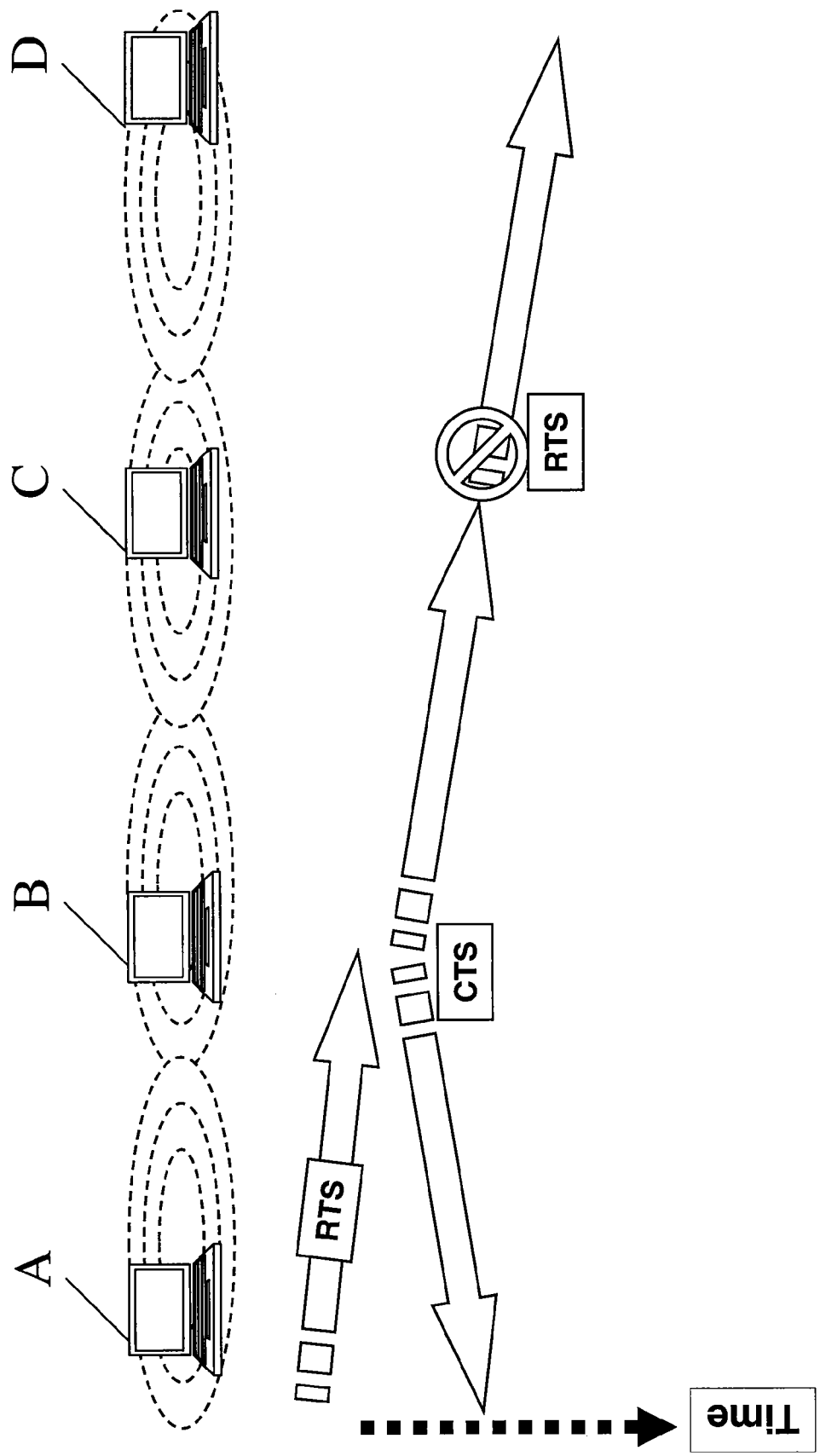
Figure 3A:
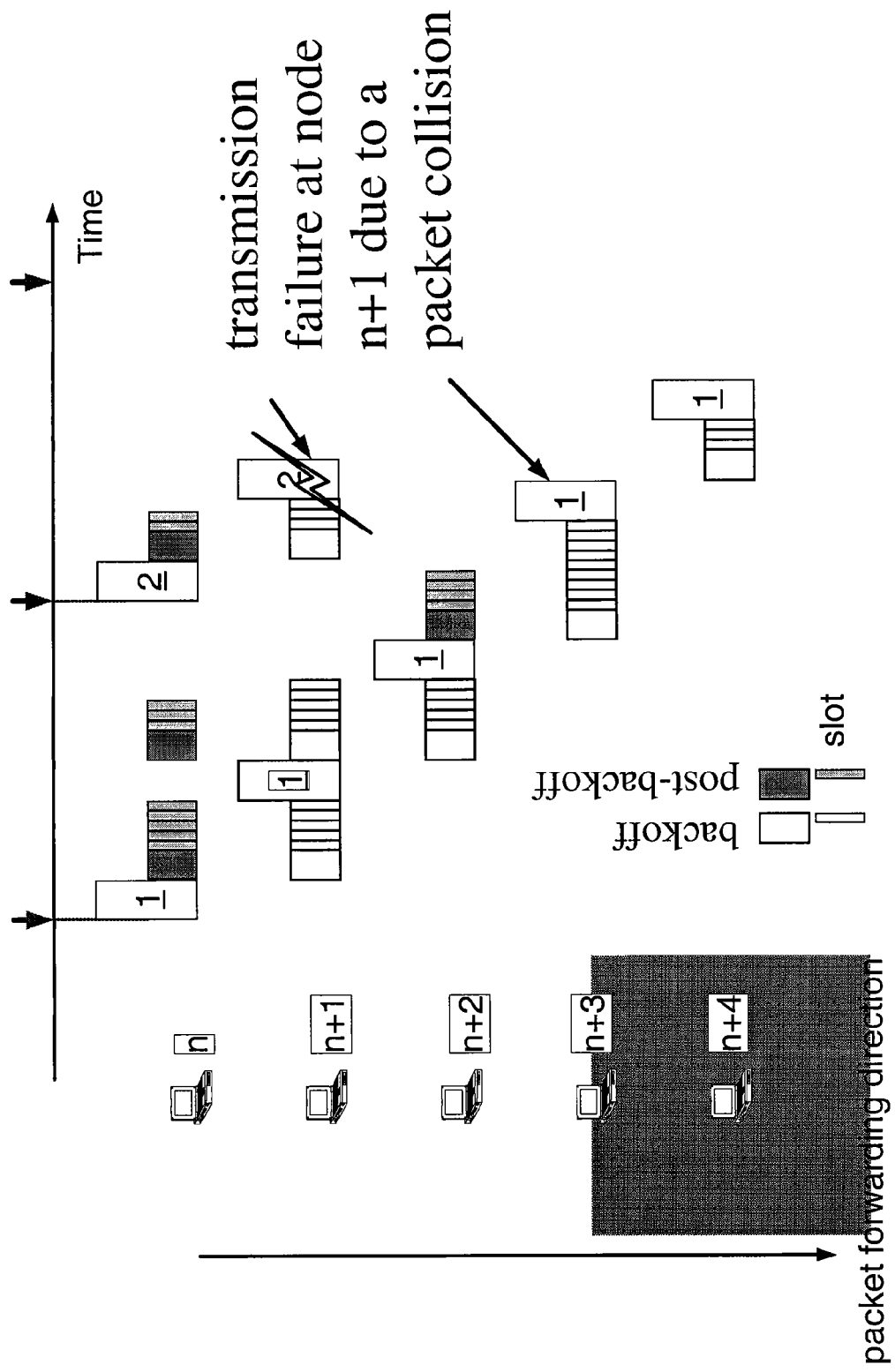
FIG. 3A is a schematic diagram illustrating multihop packet forwarding in a network system using 802.11 DCF (distributed coordination function)
Figure 3B:
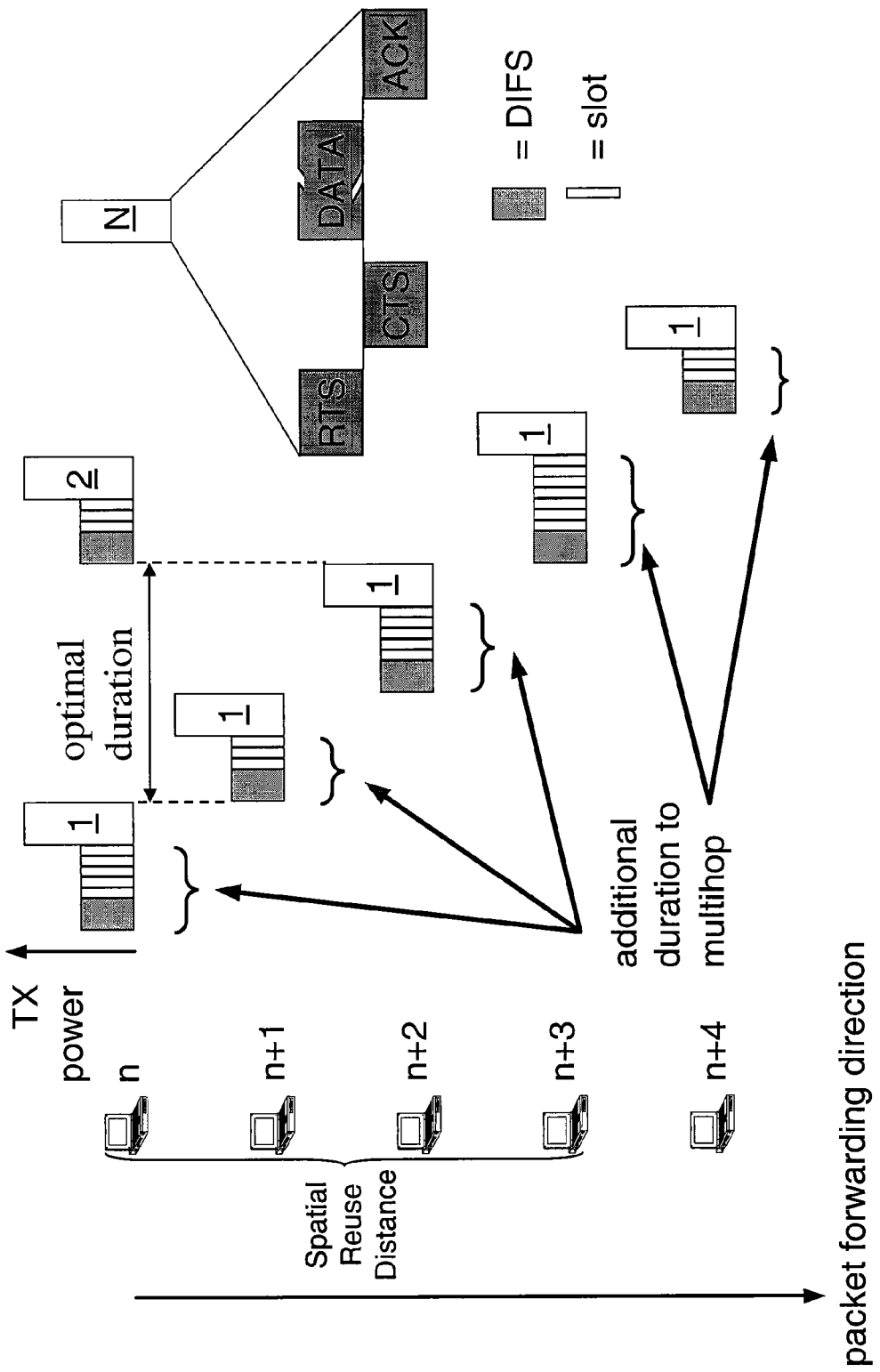
FIG. 3B is a schematic diagram illustrating multihop packet forwarding in a network system using an ideal MAC (medium access control) protocol.
Figure 4:
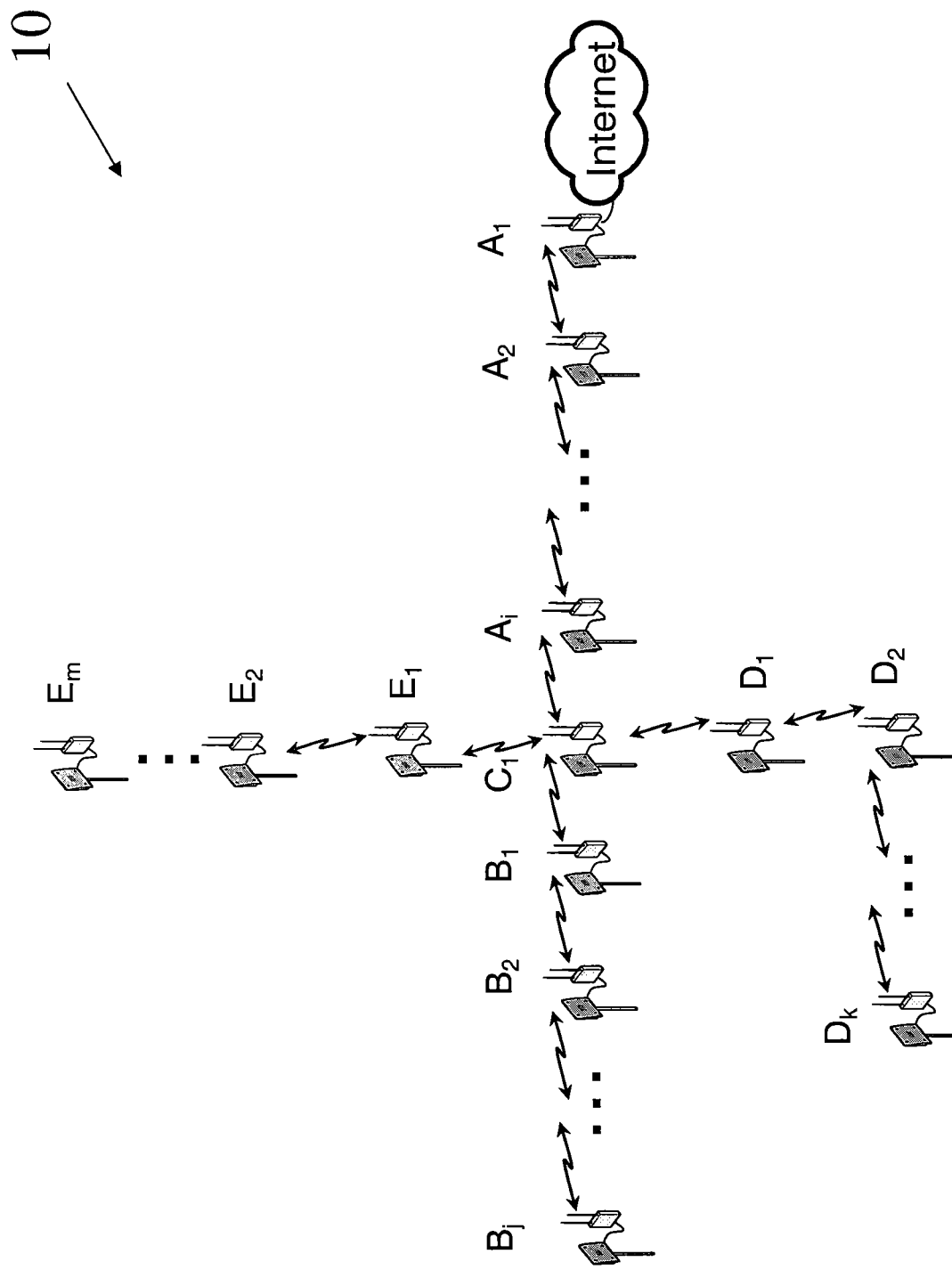
FIG. 4 is a schematic diagram of a system for data communication in a wireless mesh network in accordance with a preferred embodiment of the present invention.

FIG. 4 is a schematic diagram of a system 10 for data communication in a wireless mesh network ("WMN") in accordance with the preferred embodiment of the present invention. Referring to FIG. 4, system 10, including a plurality of nodes such as $A_1$ to $A_t$ arranged in a tree topology, functions as a wireless backbone to the Internet. Each of the nodes $A_1$ to $A_i$ includes a wireless router, which can generate traffic by itself and forward traffic for other nodes. For easy reference, a node that connects the WMN to a wired Internet gateway is called a root node (i.e., node $A_1$ in the present example), a node that has more than one child node is called a cross node (i.e., node $C_1$), and a node that has no child node is called a leaf node (i.e., nodes $B_j$, $D_k$ and $E_m$). System 10 includes one root node, at least one cross node and at least one leaf node. In the tree topology, a downlink transmission refers to packet transmission along the direction from a parent node to its child node(s). In contrast, an uplink transmission refers to packet transmission along the direction from a child node to its parent node(s). To simplify the description, it is assumed that the nodes are stationary. That is, the location of each of the nodes is fixed. Radios of nodes that are not neighbors do not interfere with each other. It is further assumed that two separate wireless channels are allocated for downlink and uplink transmissions, respectively. Furthermore, the time required to transmit a data packet is fixed.

In the Ripple protocol, six types of frames and four kinds of operational states are defined as follows.

(1) Frame Format:

The frame format used in the Ripple protocol includes:

(i) DATA frame: A DATA frame carries user information. The time required to transmit the DATA frame is a constant.

(ii) NULL frame: A NULL frame is a DATA frame carrying no information.

(iii) RTS frame: A frame sent prior to a DATA frame by a node, which has the right to send the DATA frame.

(iv) CTS frame: A frame responded by a node that receives an RTS frame.

(v) Ready-to-Receive (RTR) frame: A frame sent by a node, which has the right to receive a DATA frame, to a sender node if an expected RTS frame is not received.

(vi) ACK frame: A frame responded by a node, which receives a DATA frame correctly.

The frame formats of the RTS, CTS, DATA and ACK frames are the same as those defined in 802.11 MAC. The frame format of the RTR frame is similar to that of CTS frame except that the "Receiver Address" in the MAC header is replaced by a "Transmitter Address" to indicate the destination of the RTR frame. The inter-frame-spaces ("IFS"s) of the DATA, RTS, CTS and ACK frames are all set to be the short-IFS ("SIFS") as that defined in 802.11. The IFS for RTR frame, i.e., $IFS_{RTR}$, will be defined later. The Ripple protocol modifies the data transmission procedure of 802.11 DCF and employs RTS and RTR frames as "tokens". A node is allowed send a DATA frame only if it holds a token. The way to generate and circulate RTS and RTR tokens depends on the state of the node.

(2) Operational States:

In the Ripple protocol, each node is operated in one of the four states:

(i) Transmit (TX) state: A state that a node which is ready to send a DATA frame will enter.

(ii) Receive (RX) state: A state that a node which is ready to receive a DATA frame will enter.

(iii) Listen state: A state that a node which is a hidden node (for example, a CTS frame is overheard by the node) or an exposed node (for example, an RTS frame is overheard by the node) or both will enter. That is, a node enters this state if it overhears CTS (i.e., hidden node) and/or RTS frame (i.e., exposed node). A node in Listen state must keep silence for a network-allocation-vector (NAV) and may transmit an RTR token to its upstream node if the channel is sensed clear for $IFS_{RTR}$ after the expiry of NAV.

(iv) Idle state: A state to which a node having been interrupted by unexpected conditions when in the TX, RX, or Listen state returns. The idle state is also the initial state for all of the nodes, and may be used for initialization and fault tolerance.

Among these states, the TX, RX, and Listen state are normal states of a node while the Idle state is a state a node will enter when an error occurs.

Figure 5A:
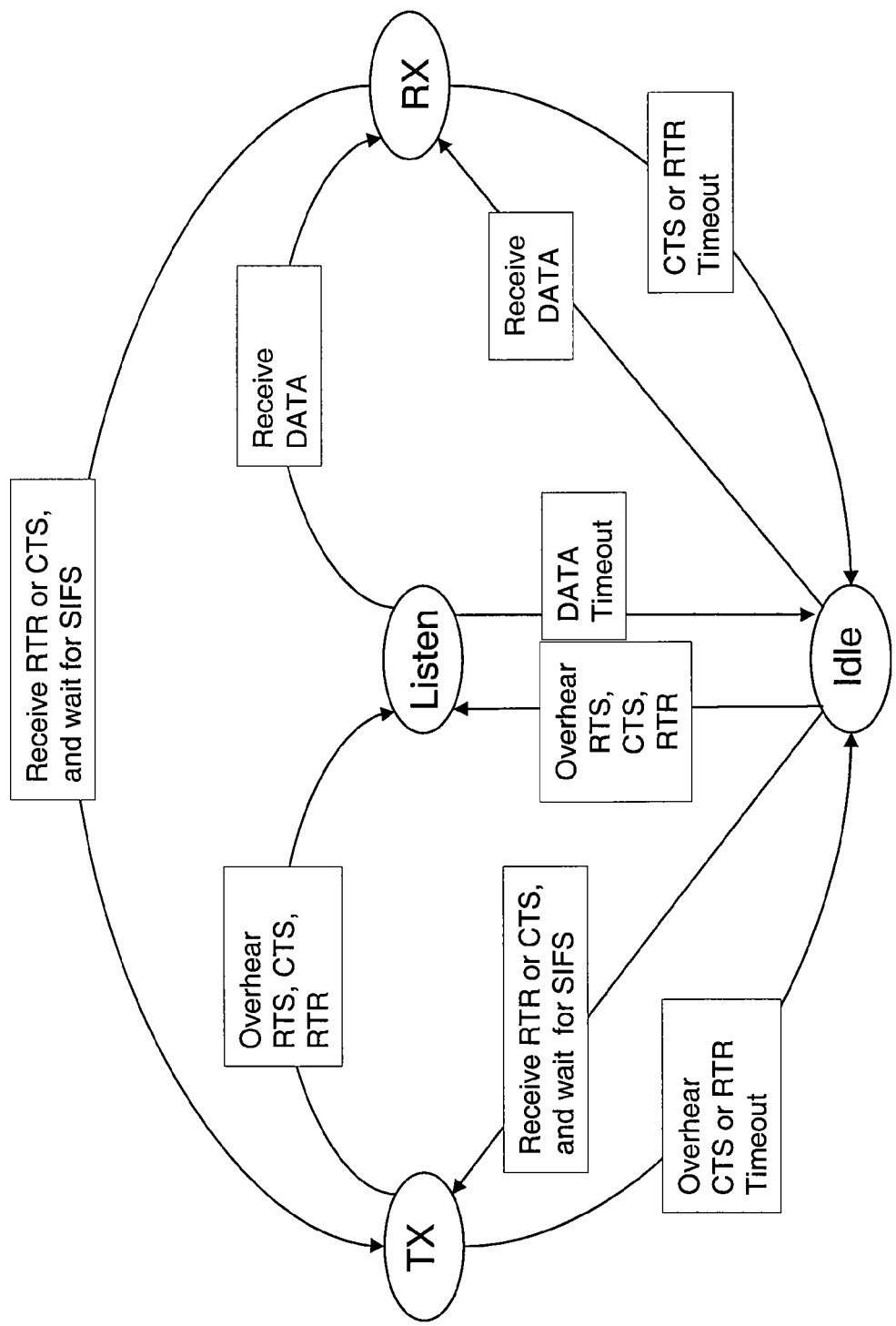
FIG. 5A is a diagram of a state machine for a downlink transmission in accordance with the preferred embodiment of the present invention.

In the following, the proposed Ripple protocol for downlink packet transmission is first described. The result is then extended to accommodate uplink packet transmission. FIG. 5A is a diagram of a state machine for a downlink transmission in accordance with the preferred embodiment of the present invention. The Ripple protocol is a distributed protocol, where the operation of each node depends only on its state machine. The state transition of each node is triggered by the transmission or reception of a frame. The Ripple protocol adopts a controlled access mechanism to eliminate the back-off inefficiencies. Similar to a token-passing protocol, the Ripple protocol utilizes a special frame as a "token" to authorize a node for sending a DATA frame. In the Ripple protocol, a tagged node that has a token at hand is eligible to perform RTS/CTS handshake with the next forwarding node. In the Ripple protocol, the RTR frame is designed to regenerate a token if the RTS frame is lost. Hence, the IFS of an RTR frame, denoted by $IFS_{RTR}$, is set to be $$IFS_{RTR} = SIFS + T_{RTS} + SIFS = 2SIFS + T_{RTS},$$

where $T_{RTS}$ is the time required by a node to transmit an RTS frame.

In the downlink transmission, a node that receives a CTS or an RTR frame has the right to transmit a DATA packet to its next forwarding node (i.e., the immediate child node of the tagged node). Note that a cross node may use any pre-defined scheduling algorithm for selecting a child node to be the next forwarding node. Referring to FIG. 5A, except for the root node and leaf nodes, each node is normally circulated among the TX, Listen and RX states in turn. Hence, each node will have the equal chance to utilize the shared wireless medium in the downlink data transfer. However, the root node is normally circuited among the TX, Listen and Idle states because it receives downlink packets from the Internet gateway through the wire. Similarly, the leaf nodes are normally circulated among the Idle, Listen, RX states because they do not have child nodes for forwarding downlink packets.

Consider a tagged node running at TX state, the tagged node sends a DATA (or NULL) frame to the next forwarding node and expects to receive an ACK frame. Note that the tagged node may not have to forward the same DATA frame, which is received from its parent node, to the next forwarding node. That is, each node may schedule its packet transmission based on the QoS requirement of packets stored in its queues. By overhearing an RTS/CTS handshake or RTR frame broadcasted by its neighboring nodes, the tagged node will move to the Listen state. At the Listen state, the tagged node has to keep silent for network-allocation-vector (NAV), which is specified in the duration field of the overheard frame header. The tagged node will expect to receive an RTS frame from its parent node after the expiry of the NAV. In case that the RTS frame is lost, the tagged node should send an RTR frame to its parent node if the channel has been idle for $IFS_{RTR}$ after the expiry of the NAV. That is, the Ripple protocol utilizes RTR frame to survive from RTS transmission failure. In order to exploit spatial reuse, the Ripple protocol further uses an RTR frame to trigger new ripples for nodes at Idle state. Note that child nodes of a cross node are not allowed to transmit the RTR frame to the cross node in order to prevent from the collision of RTR frames at the cross node. The tagged node moves to RX mode as soon as it receives a DATA or NULL frame. In the RX state, the tagged node responds with an ACK frame if the DATA frame is correctly received and then transmits an RTS frame to its child node after $IFS_{RTS}$. If the tagged node receives a token from its child node, the tagged node waits for SIFS and moves to the TX state. Note that, during any state, the tagged node is forced to enter Idle state whenever an unexpected error occurs.

Although the Ripple protocol adopts a similar approach as the cut-through used by the direct cut through medium access (DCMA) and queue driven cut through medium access (QCMA), protocols in which a tagged node performs an RTS/CTS handshake with the next forwarding node immediately after replying to an ACK frame to a sender node, the purpose of RTS/CTS is quite different. The Ripple protocol utilizes the RTS/CTS to trigger state transitions of neighboring nodes while DCMA and QCMA use the RTS/CTS to reserve the wireless channels from the next forwarding node. Moreover, the Ripple protocol utilizes a different mechanism to handle transmission errors than that used by DCMA/QCMA. Specifically, the Ripple protocol will force a tagged node to enter Idle state, while DCMA and QCMA adopt an exponential backoff algorithm to re-transmit a packet. In the proposed Ripple protocol, each node accesses the shared wireless medium in a manner similar to time-division multiple access ("TDMA"). In contrast to the TDMA technology used in cellular networks, which requires all mobile stations to be perfectly synchronized to a centralized base station, the Ripple protocol is running in a distributed manner and only requires local synchronization among neighboring nodes. The local synchronization is achieved by sharing the timing information with nodes within its one hop radius through the NAV carried by control packets. Hence, the proposed Ripple protocol may enhance the network utilization of 802.11 by preventing from unintentional packet collisions. The enhancement is significant in heavy-loaded environments.

Figure 5B:
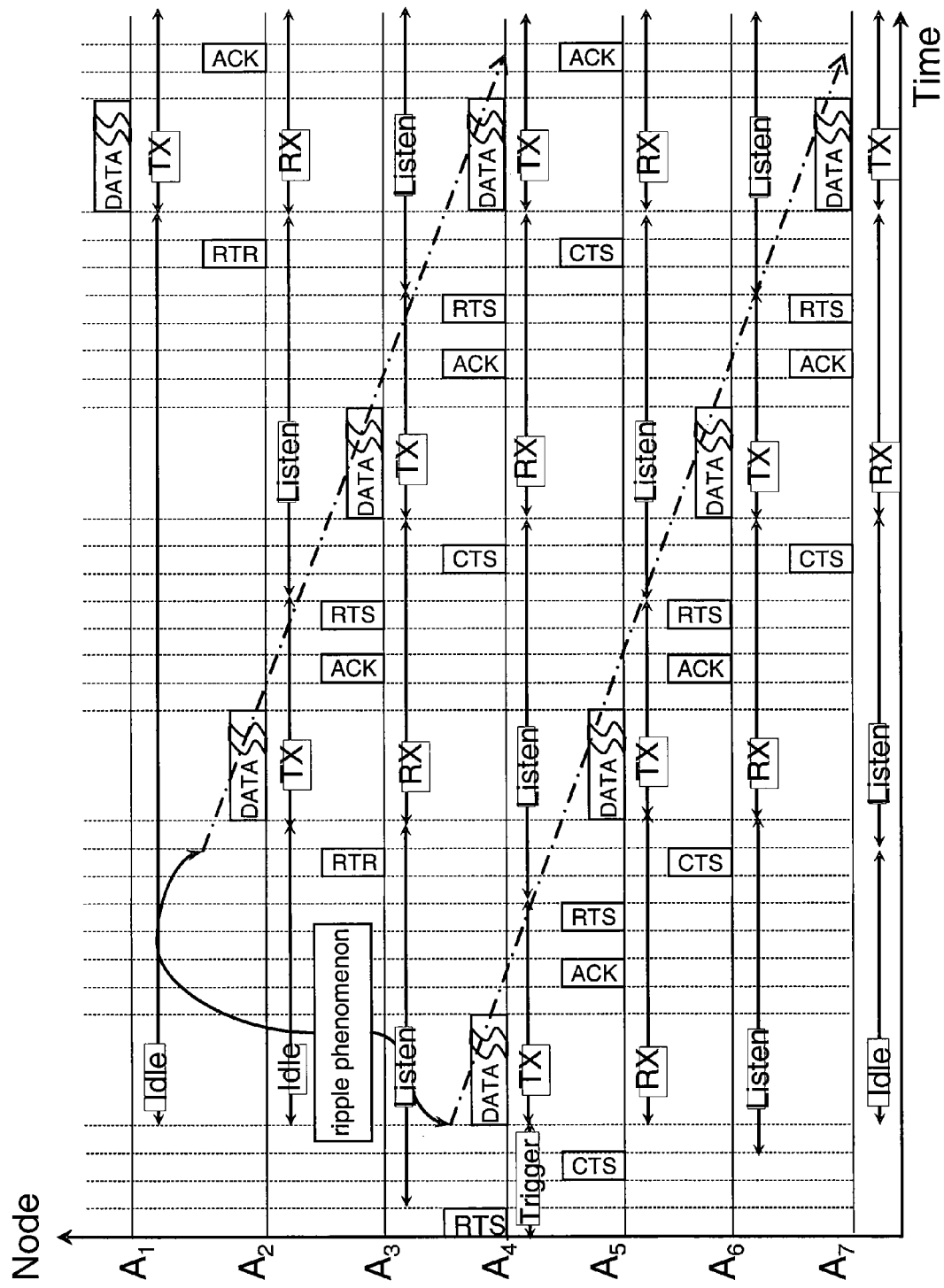
FIG. 5B is a timing diagram of a downlink transmission in accordance with the preferred embodiment of the present invention.

FIG. 5B is a timing diagram of a downlink transmission in accordance with the preferred embodiment of the present invention. Referring to FIG. 5B and also FIG. 4, initially, all of the nodes except a supernode are placed at the Idle state. The supernode, i.e., node $A_4$ in the preferred embodiment, refers to one in WMN which is responsible for initializing an RTS/CTS handshake with its child node. After the RTS/CTS handshake, the network initialization procedure is completed and thus, nodes $A_4$ and $A_5$ move to the TX and RX states, respectively. During the TX state, node $A_4$ sends a DATA (or NULL) frame to node $A_5$, receives an ACK frame, and moves to the Listen state by overhearing an RTS/CTS handshake initiated by node $A_5$. The process continues such that DATA frames are forwarded hop-by-hop as ripples and thus, activates the "ripple phenomenon." Note that node $A_3$ also enters the Listen state when it overhears an RTS frame broadcasted by the supernode during initialization. Node $A_3$ will not receive an RTS frame from node $A_2$ because node $A_2$ is initially Idle. Hence, node $A_3$ sends an RTR frame to node $A_2$ when node $A_3$ senses the channel having been idle for $IFS_{RTS}$ after the expiry of the NAV (i.e., it is set by the overheard RTS frame initialized by node $A_4$). With the RTR frame (i.e., the token) at hand, node $A_2$ transmits a DATA frame to node $A_3$ and thus, triggers a new ripple. Similar results can be applied to resume an interrupted ripple resulting from the noisy wireless channel.

Figure 5C:
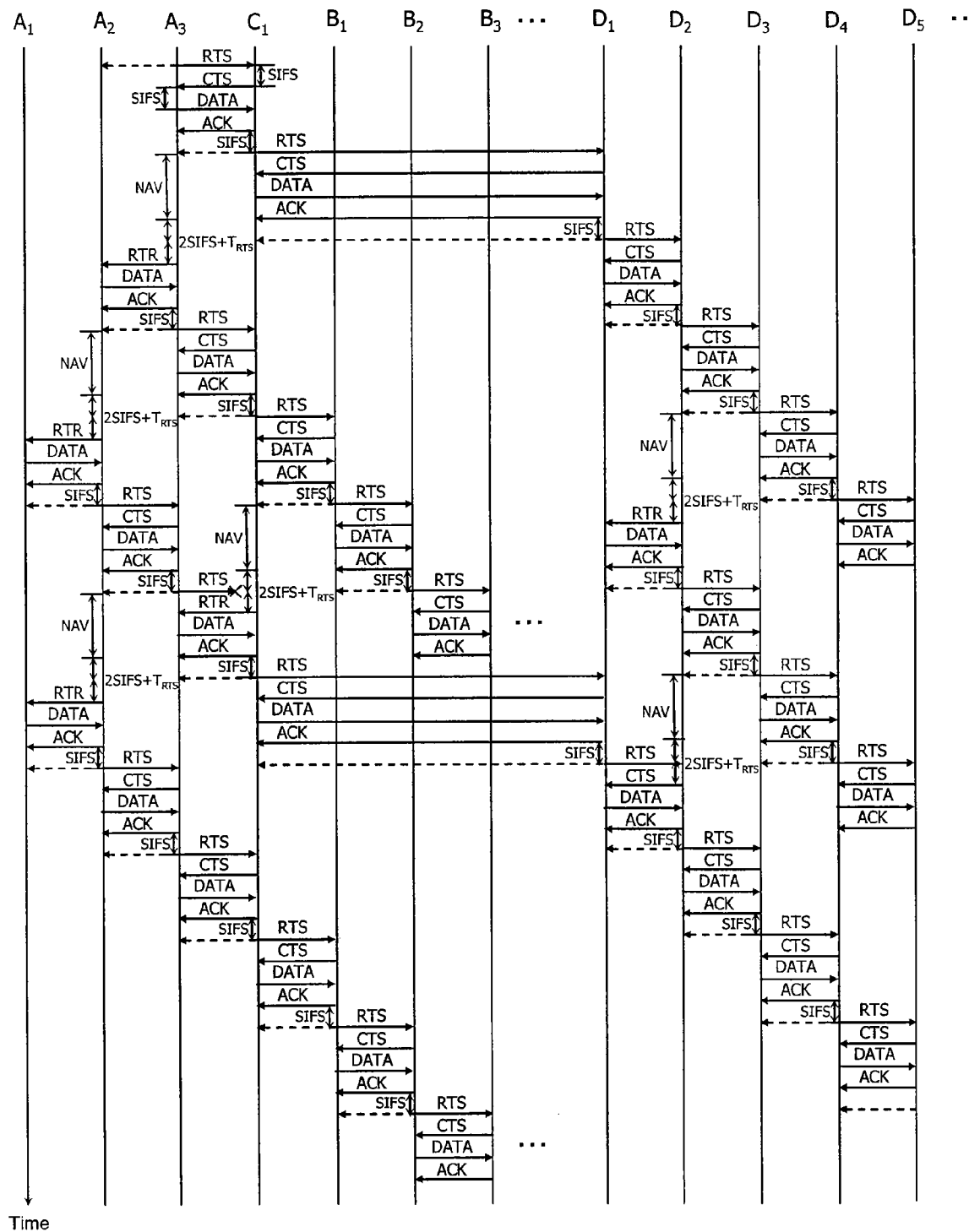
FIG. 5C is a plot illustrating a message sequence for a downlink transmission in accordance with the preferred embodiment of the present invention.

FIG. 5C is a plot illustrating a message sequence for a downlink transmission in accordance with the preferred embodiment of the present invention. In the preferred embodiment, the mesh topology of FIG. 4 is adopted, where i=3, j=3, k=5 and m=0 are presumed. The cross node $C_1$ utilizes but is not limited to a Round-Robin method to choose the next forwarding node. Furthermore, the propagation delay between two adjacent nodes is neglected. Since the location of each node is fixed, the operation of the Ripple protocol will not be affected by different propagation delay values or different scheduling algorithms. Referring to FIG. 5C, an RTR frame is used (e.g., by node $A_2$) for generating a new ripple or (e.g., by node $C_1$) for surviving from RTS transmission failure. Two branches of the tree topology, i.e., one for node Cs and the other for node Bs, are independently operated because the child nodes of the cross node (i.e., nodes $B_1$ and $D_1$) are prohibited from sending an RTR frame. Hence, both node $B_2$ and $D_2$ may automatically trigger a new ripple by themselves after $IFS_{RTS}$. Furthermore, packets in the paths of ($A_1$, $C_1$), ($A_2$, $B_1$) or ($A_2$, $D_1$, $D_4$), ($A_3$, $B_2$), and ($A_3$, $D_2$) may be simultaneously transmitted. That is, the optimal channel utilization of ⅓ due to spatial-reuse may be achieved.

Figure 6A:
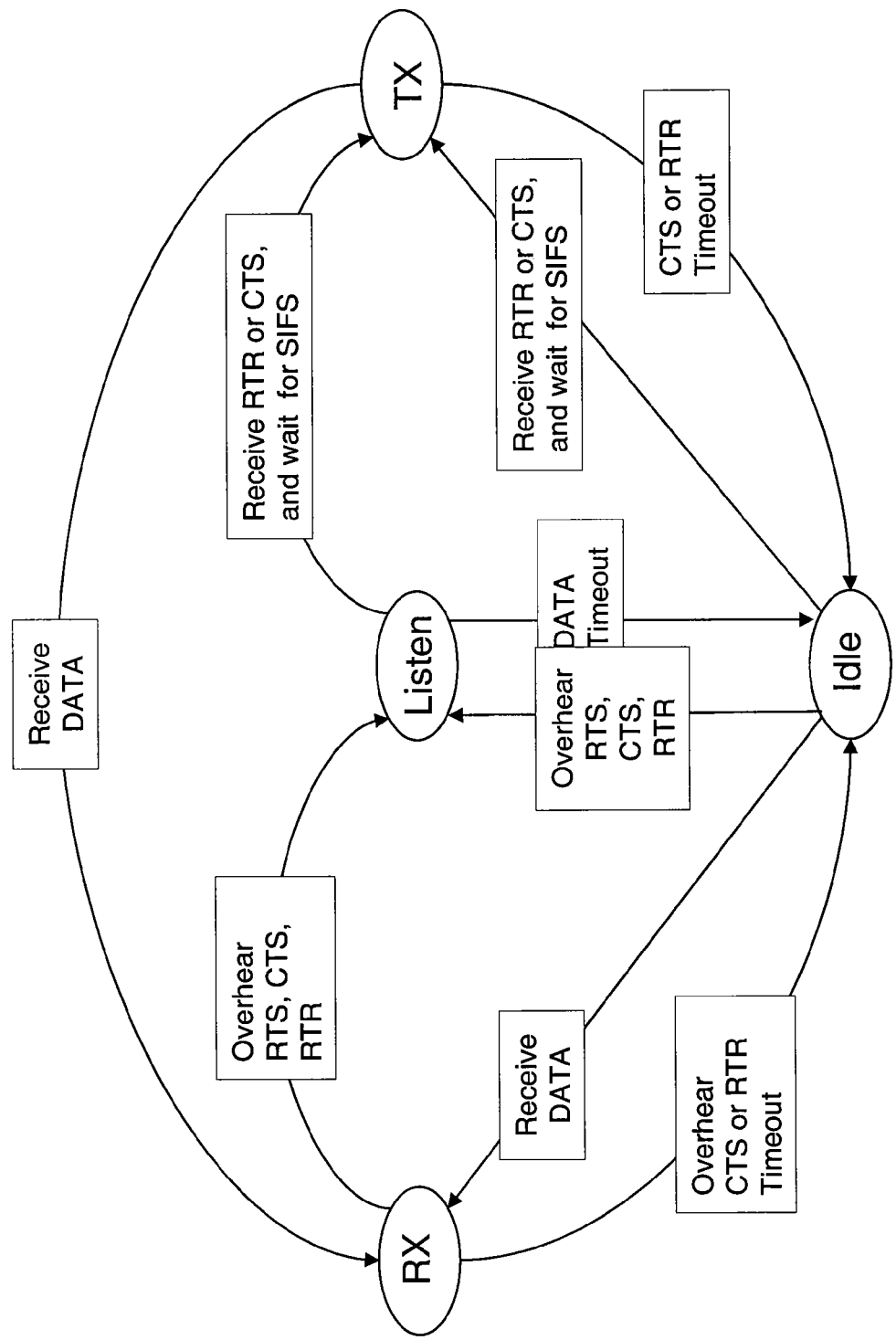
FIG. 6A is a diagram of a state machine for an uplink transmission in accordance with the preferred embodiment of the present invention.

FIG. 6A is a diagram of a state machine for an uplink transmission in accordance with the preferred embodiment of the present invention. In an uplink transmission, the roles of sender and receiver are interchanged. The next forwarding node as default is the parent node of the tagged node. A tagged node that overhears the transmission of any token will move to the Listen state which is eligible to send an RTS frame to the next forwarding node at the expiry of the overheard NAV. In the uplink transmission, a tagged node always forwards packets to its parent node. Since a cross node may have more than one child node, the cross node utilizes the RTR frame to authorize a child node to transmit in the uplink direction.

Referring to FIG. 6A, normally in an uplink transmission, each of the nodes except the root node and leaf nodes is circulated among the TX, RX and Listen states in turn. Hence, each of the nodes will have the equal chance to utilize the shared wireless medium in the uplink data transfer. Consider a tagged node in the TX state, the tagged node transmits a DATA (or NULL) frame to its parent node and expects to receive an ACK frame therefrom. After reception of the ACK frame, the tagged node expects to receive an RTS frame from its child node, responds with a CTS frame, waits SIFS, and moves to the RX state. If the RTS frame is not received, the tagged node will send an RTR frame to its child node to request a transmission if the channel is sensed idle for $IFS_{RTR}$ after responding the ACK frame. Moreover, the cross node should adopt a predefined scheduling algorithm to select a child node as the destination of RTR frame since each cross node has more than one child node. The tagged node moves to the RX state when it starts to receive a DATA (or NULL) frame from its child node. At the RX state, the tagged node responds with an ACK frame if the DATA (or NULL) frame is correctly received. The tagged node then moves to the Listen state and keeps silent for NAV when it overhears the RTS/CTS handshake performed by its neighboring nodes. During the Listen state, the tagged node transmits an RTS frame after $IFS_{RTS}$ at the expiry of NAV and then expects to receive a CTS frame. The tagged node may alternatively receive an RTR frame, which is actively sent by the next forwarding node if the RTS frame is lost. One exception is that child nodes of a cross node are forbidden to transmit the RTS frame in order to prevent from collision of RTS frames at the cross node. At the reception of either a CTS or RTR frame, the tagged node waits for SIFS and moves to the TX state again. During any state, the tagged node is forced to enter the Idle state whenever an unexpected error occurs.

Figure 6B:
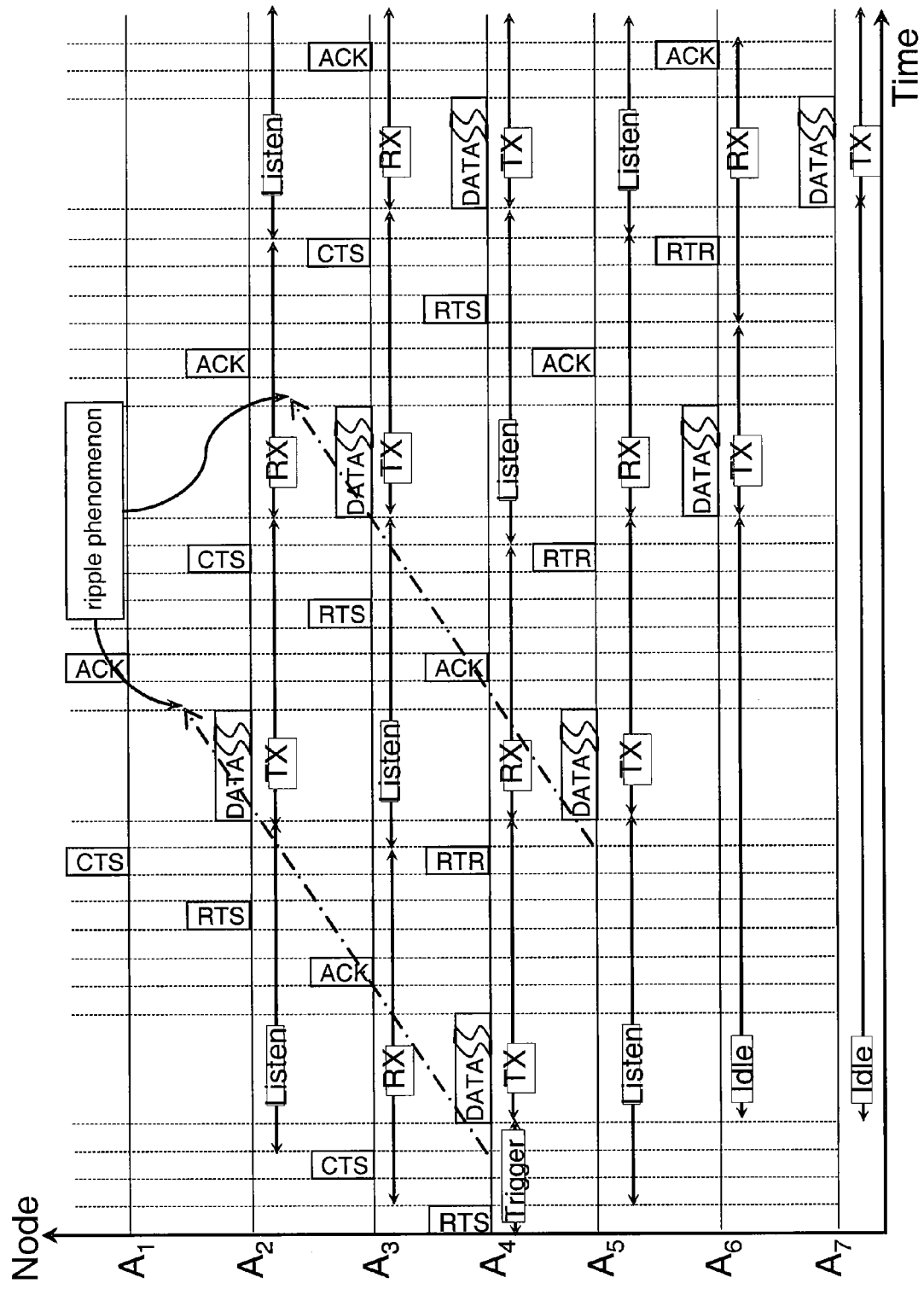
FIG. 6B is a diagram of a timing specification for an uplink transmission in accordance with the preferred embodiment of the present invention.

FIG. 6B is a diagram of a timing specification for an uplink transmission in accordance with the preferred embodiment of the present invention. Referring to FIG. 6B, initially, all of the nodes except a supernode are placed at the Idle state. The supernode (i.e., node $A_4$) is responsible for triggering the first ripple by sending an RTS frame to the next forwarding node (i.e., node $A_3$). Node $A_5$ enters the Listen state when it overhears the RTS frame broadcast by the supernode. After an RTS/CTS handshake, the network initialization procedure is completed and thus, nodes $A_4$ and $A_3$ moves to the TX and RX states, respectively. During the TX state, node $A_4$ sends a DATA (or NULL) frame to node $A_3$ and expects to receive an ACK frame. Since node $A_2$ gets the token (i.e., it overhears the RTS/CTS handshake), it is eligible to send an RTS frame to the next forwarding node (i.e., Node $A_1$). The process continues such that DATA frames are forwarded hop-by-hop as ripples toward node $A_1$. Hence, the "ripple phenomenon" is activated. Note that node $A_5$ also enters the Listen state when it overhears the RTS frame broadcast by node $A_4$ during initialization. Hence, node $A_5$ sends a DATA frame to node $A_4$ after the RTS/CTS handshake sent by nodes $A_5$ and $A_4$, which triggers a new ripple. In an uplink transmission, the RTR frame is also used for generating a new ripple or for surviving from any RTS transmission failure.

As mentioned, the Ripple protocol is developed based on the assumption that the radios or transmission ranges of nodes that are not neighbors do not interfere with each other. That is, a node and another node spaced apart by at least three hops, for example, nodes $A_1$ and $A_4$ shown in FIG. 5B, will not interfere one another. Under this assumption, the Ripple protocol can achieve the optimal channel utilization of $\frac{1}{3}$. Denote $p_{ij}$ as the state transition probability from state i to state j and $P_i$ as the state probability of a tagged node, where i, j∈{TX, RX, Listen, Idle}, respectively. In an error-free channel, $p_{TX,Idle}=p_{RX,Idle}=p_{Listen,Idle}=0$ and $p_{TX,Listen}=p_{Listen,RX}=p_{RX,TX}=1$. It can be shown that $P_{TX}=P_{RX}=P_{Listen}=\frac{1}{3}$ since each node has an equal chance to get the token. In other words, a node attains the optimal utilization of $\frac{1}{3}$ under spatial-reuse. The utilization is worse if the radios can interfere with each other beyond the range at which they can communicate successfully. However, the proposed Ripple protocol may be modified to accommodate this situation. The major modification of the Ripple protocol is that each node has to stay in a Listen state for N times during the period it transits from TX state to RX state, where N is an integer depending on the radio interference range of each node.

In describing the preferred embodiment of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the preferred embodiment described above without departing from the broad inventive concept thereof. It is understood, therefore, that this invention is not limited to the particular embodiment disclosed, but is intended to cover modifications within the spirit and scope of the present application as defined by the appended claims.

We claim:

1. A method for data communication in a wireless mesh network, comprising:
   providing a plurality of nodes being stationary with respect to each other;
   disposing the plurality of nodes in a pattern including at least one path, each of the plurality of nodes located in the at least one path having a transmission range overlapped with that of an immediately adjacent node;
   performing a first handshake between a first node and a second node in the at least one path, the second node being disposed immediately downstream from the first node;
   entering the first node into a first state in which the first node is ready to transmit a data frame;
   entering the second node into a second state in which the second node is ready to receive a data frame;
   transmitting a first data frame from the first node to the second node;
   performing a second handshake between the second node and a third node disposed immediately downstream from the second node;
   switching the first node to a third state in which the first node is prohibited from transmitting or receiving a data frame;
   switching the second node to the first state;
   entering the third node into the second state;
   transmitting a second data frame from the second node to the third node;
   entering a fourth node disposed immediately upstream from the first node in the at least one path into the third state in response to the first handshake;
   transmitting an RTR frame from the fourth node to a fifth node disposed immediately upstream the fourth node in the at least one path;
   entering the fourth node into the second state; and
   entering the fifth node into the first state.

2. The method of claim 1, further comprising:
   connecting one of the plurality of nodes in the at least one path to a wired gateway; and
   transmitting the first data frame in a direction away from the wired gateway.

3. The method of claim 1, in performing the first handshake, further comprising:
   transmitting a ready-to-send (RTS) frame from the first node; and
   transmitting a clear-to-send (CTS) frame from the second node in response to receiving the RTS frame.

4. The method of claim 3, further comprising transmitting a ready-to-receive (RTR) frame from the second node in response to a transmission failure of the RTS frame requesting the first node to send an RTS frame.

5. The method of claim 2, further comprising switching in turn the gateway-connected node among an initial state, the first state and the third state.

6. The method of claim 1, further comprising switching in turn a node disposed most downstream in the at least one path among an initial state, the third state and the second state.

7. A method for data communication in a wireless mesh network, comprising:
   providing a plurality of nodes being stationary with respect to each other;
   disposing the plurality of nodes in a pattern including at least one path, each of the plurality of nodes located in the at least one path having a transmission range overlapped with that of an immediately adjacent node;

performing a first handshake between a first node and a second node in the at least one path, the second node being disposed immediately downstream from the first node;

entering the first node into a first state in which the first node is ready to transmit a data frame;

entering the second node into a second state in which the second node is ready to receive a data frame;

transmitting a first data frame from the first node to the second node;

performing a second handshake between the second node and a third node disposed immediately downstream from the second node;

switching the first node to a third state in which the first node is prohibited from transmitting or receiving a data frame;

switching the second node to the first state;

entering the third node into the second state;

transmitting a second data frame from the second node to the third node; and prohibiting a node disposed upstream from a cross node located at an intersection of the at least one path with a second path different from the at least one path from transmitting an RTR frame requesting the cross node to send the RTS frame.

8. A method for data communication in a wireless mesh network, comprising:

providing a plurality of nodes being stationary with respect to each other;

disposing the plurality of nodes in a pattern including at least one path, each of the plurality of nodes located in the at least one path having a transmission range overlapped with that of an immediate adjacent node located in the at least one path;

passing a token from a first node to a second node disposed immediately downstream from the first node in the at least one path by transmitting a first data frame from the first node to the second node;

entering the first node into a first state at which the first node is prohibited from transmitting or receiving a data frame;

entering the second node into a second state at which the second node is ready to transmit a data frame;

passing the token from the second node to a third node disposed immediately downstream the second node in the at least one path by transmitting a second data frame from the second node to the third node;

switching the first node to a third state at which the first node is ready to receive a data frame;

switching the second node to the first state;

entering the third node into the second state;

transmitting an RTR frame from a fourth node in the first state to a fifth node in an initial state, the fifth node being disposed immediately upstream from the fourth node;

switching the fourth node to the third state; and switching the fifth node to the second state in response to receiving the RTR frame.

9. The method of claim 8, further comprising switching each of the first, second and third nodes among the second state, the first state and the third state in turn.

10. The method of claim 8, further comprising returning one of the first, second or third nodes to the initial state in response to an error.

11. The method of claim 8, further comprising:

transmitting a first ready-to-send (RTS) frame from the first node to the second node before transmitting a first data frame; and transmitting a ready-to-receive (RTR) frame from the second node requesting the first node to send a second RTS frame in response to a transmission failure of the first RTS frame.

12. A method for data communication in a wireless mesh network, comprising:

providing a plurality of nodes being stationary with respect to each other;

disposing the plurality of nodes in a pattern including at least one path, each of the plurality of nodes located in the at least one path having a transmission range overlapped with that of an immediately adjacent node located in the at least one path;

performing a first handshake between a first node and a second node, the second node being disposed immediately upstream from the first node in the at least one path;

entering the first node into a first state at which the first node is ready to transmit a data frame;

entering the second node into a second state in which the second node is ready to receive a data frame;

transmitting an acknowledge frame from the second node;

performing a second handshake between a third node and a fourth node respectively in response to the acknowledge frame, the fourth node being disposed immediately upstream from the second node and the third node in the at least one path;

switching the first node to the second state;

switching the second node to a third state at which a node is prohibited from transmitting or receiving a data frame;

entering the third node into the first state;

entering the fourth node into the second state; and prohibiting a node disposed downstream from a cross node located at an intersection of the at least one path and a second path different from the at least one path from transmitting an RTS frame.

13. The method of claim 12, further comprising:

connecting one of the plurality of nodes to a wired gateway; and transmitting a data frame in a direction toward the gateway-connected node in the at least one path.

14. The method of claim 12, further comprising entering a fifth node disposed immediately downstream from the first node in the at least one path into the third state in response to the first handshake.

15. The method of claim 12, in performing the first handshake, further comprising:

transmitting a ready-to-send (RTS) frame from the first node; and transmitting a clear-to-send (CTS) frame from the second node in response to the RTS frame.

16. The method of claim 15, further comprising transmitting a ready-to-receive (RTR) frame from the second node in response to a transmission failure of the RTS frame requesting the first node to send an RTS frame.

17. The method of claim 14, further comprising:

transmitting an RTR frame from the first node to the fifth node requesting the fifth node to send an RTS frame;

entering the first node into the second state; and entering the fifth node into the first state.

18. A method for data communication in a wireless mesh network, comprising:

providing a plurality of nodes being stationary with respect to each other;

disposing the plurality of nodes in a pattern including at least one path, each of the plurality of nodes located in the at least one path having a transmission range overlapped with that of an immediate adjacent node located in the at least one path;

performing a first handshake between a (3N−2)-th node and a (3N−1)-th node in the at least one path, the (3N−1)-th node being disposed immediately upstream the (3N−2)-th node, N being an integer greater than zero;

entering the (3N−2)-th node into a first state at which the (3N−2) node is ready to transmit a data frame;

entering the (3N −1)-th node into a second state at which the (3N−1) node is ready to receive a data frame;

transmitting an acknowledge frame from the (3N−1)-th node;

performing a second handshake between the 3N-th node and the (3N +1)-th node in response to the acknowledge frame, the 3N-th node and the (3N+1)-th node being respectively disposed immediately upstream the (3N−1)-th node and the 3N-th node;

switching the (3N−2)-th node to the second state;

switching the (3N−1)-th node to a third state at which a node is prohibited from transmitting or receiving a data frame;

entering the 3N-th node into the first state; and entering the (3N+1) node into the second state;

transmitting an RTR frame from a first node in the first state to a second node in the third state;

switching the first node to the second state; and switching the second node to the first state in response to receiving the RTR frame.

19. The method of claim 18, further comprising:

transmitting a first ready-to-send (RTS) frame from a first node to a second node before transmitting a data frame; and transmitting a ready-to-receive (RTR) frame from the second node requesting the first node to send a second RTS frame in response to a transmission failure of the first RTS frame.

20. The method of claim 18, further comprising:

connecting one of the plurality of nodes in the at least one path to a wired gateway; and switching, in turn, the gateway-connected node among an initial state, the second state and the third state.

* * * * *